(12) United States Patent
Takakura et al.

(10) Patent No.: US 10,502,269 B2
(45) Date of Patent: Dec. 10, 2019

(54) FRICTION PLATE

(71) Applicant: DYNAX CORPORATION, Chitose-shi, Hokkaido (JP)

(72) Inventors: Norio Takakura, Sapporo (JP); Shahjada Ahmed Pahlovy, Chitose (JP); Akihito Oikawa, Eniwa (JP); Ryo Ohashi, Chitose (JP)

(73) Assignee: Dynax Corporation, Chitose-shi, Hokkaido (JP)

( * ) Notice: Subject to any disclaimer, the term of this patent is extended or adjusted under 35 U.S.C. 154(b) by 0 days.

(21) Appl. No.: 15/880,741

(22) Filed: Jan. 26, 2018

(65) Prior Publication Data

US 2018/0216674 A1 Aug. 2, 2018

(30) Foreign Application Priority Data

Jan. 27, 2017 (JP) .................................. 2017-012967

(51) Int. Cl.
| | |
|---|---|
| *F16D 13/64* | (2006.01) |
| *F16D 13/72* | (2006.01) |
| *F16D 65/12* | (2006.01) |
| *F16D 69/00* | (2006.01) |

(52) U.S. Cl.
CPC ........... *F16D 13/648* (2013.01); *F16D 13/72* (2013.01); *F16D 65/127* (2013.01); *F16D 2069/004* (2013.01)

(58) Field of Classification Search
CPC ........ F16D 13/64; F16D 13/648; F16D 13/72; F16D 65/127; F16D 2300/0214; F16D 2069/004; F13D 13/74
See application file for complete search history.

(56) References Cited

U.S. PATENT DOCUMENTS

| | | | | |
|---|---|---|---|---|
| 3,972,400 A | * | 8/1976 | Howells | F16D 13/60 192/107 R |
| 5,176,236 A | * | 1/1993 | Ghidorzi | F16D 13/64 188/218 XL |
| 6,293,382 B1 | | 9/2001 | Nishide et al. | |
| 2007/0017773 A1 | * | 1/2007 | Suzuki | F16D 13/648 192/113.36 |
| 2012/0118696 A1 | * | 5/2012 | Fabricius | F16D 13/648 192/107 R |
| 2013/0032271 A1 | * | 2/2013 | Reiners | F16D 13/64 156/60 |

FOREIGN PATENT DOCUMENTS

| | | |
|---|---|---|
| DE | 102012014811 | 1/2014 |
| EP | 1234991 | 8/2002 |
| JP | 11336805 | 12/1999 |
| JP | 2001-221252 | 8/2001 |
| JP | 2005-351296 | 12/2005 |

OTHER PUBLICATIONS

European Search Report filed in EP18153710 dated Jun. 18, 2018.

* cited by examiner

*Primary Examiner* — Jacob S. Scott
*Assistant Examiner* — Lillian T Nguyen
(74) *Attorney, Agent, or Firm* — Rankin, Hill & Clark LLP

(57) ABSTRACT

For a friction plate, when a friction clutch is in a disengagement state, a lubricating oil flowing from an outer circumferential oil groove into an inner circumferential side and rides onto a first segment of a first friction material set. For the friction plate, the lubricating oil flowing from an inner circumferential oil groove into the outer circumferential side rides onto a third segment of a second friction material set.

11 Claims, 3 Drawing Sheets

FRICTION PLATE

FIELD OF THE INVENTION

The present invention relates to a friction plate used for a friction clutch which carries out friction engaging of friction plates which are soaked in lubricating oil (wet type friction plates) with mating plates so as to transmit a torque.

BACKGROUND ART

A friction clutch typically includes two or more mating plates which rotate in conjunction with one shaft and a friction plate disposed alternately between the mating plates so as to rotate in conjunction with another shaft. When a piston is actuated so that the mating plate and the friction plate come into friction engagement with each other by pressing the mating plate, a torque may be transmitted between those two shafts. Mating plates and friction plates are soaked in lubricating oil so as to be cooled down by lubricating oil. Friction material is bonded on the surface (both surfaces) of the friction plate facing the mating plate. Oil grooves are usually provided on the surface of the friction material or between the adjacent friction material segments to make the lubricating oil flow.

When the piston is not operating in a friction clutch, namely the clutch is out of engagement (which is also out of operation and out of fastening), it is ideal that a torque is not transmitted at all between the mating plates and friction plates so as not to cause power loss. In practice, however, even in a disengagement state of a friction clutch, a small amount of torque is likely to be transmitted between the mating plates and friction plates because of the lubricating oil between them. This is occurred by a share resistance force of the lubricating oil which is generated by passing through the oil groove of the friction plate while lubricating oil is dragged in the circumferential direction by the mating plate which rotates in a disengagement state of a friction clutch. Torque transmitted in this way is referred to as drag torque.

It is known that the drag torque may be reduced by increasing the content of air in the lubricating oil. Also, in order to reduce the drag torque, friction plates provided with various-shaped friction materials and oil grooves have been devised so far, and some are disclosed in the following examples.

PRIOR ART DOCUMENT

Patent Document

[Patent Document 1]
Japanese Patent Application Publication No. 2001-221252
[Patent Document 2]
Japanese Patent Application Publication No. 2005-351296

The patent document 1 shows a friction plate which comprises a core plate and a friction material bonded on both side faces of the core plate. Plural rows of first oil grooves communicating inner and outer circumferential edges of the friction material and second oil grooves mutually communicating intermediate parts of adjacent first oil grooves are formed on the friction material.

The first oil grooves are arranged tilted a certain angle toward a circumferential direction of the core plate with respect to radial lines passing radial direction inner ends of the first oil grooves. The second oil grooves are arranged tilted in the same direction as the first oil grooves with an acute angle larger than the certain angle α with respect to the radial lines passing radial direction inner ends of the second oil grooves.

The patent document 2 shows a friction plate disposed in a frictional engagement device which comprises a disc-shaped core plate and a plurality of friction plate segments in a predetermined shape. The friction plate segments are respectively adhered on the surface of the core plate and an oil groove is formed by the gap between the adjacent friction plate segments. Each oil groove is respectively opened to inner and outer circumferential edges of the core plate. Each oil groove also has a convex shape in the middle thereof, which is turned in the direction opposite to the rotation direction of the friction plate.

According to the friction plate disclosed in the patent document 1, the first oil groove and the second oil groove exert a screw pump action so as to transfer the oil between the friction material and clutch disc to the inner or outer circumference of the friction plate by scraping off the oil. Thereby, the drag torque by the viscosity of the oil between friction plate and the clutch disc is significantly reduced and the whole friction material can be cooled effectively.

According to the friction plate disclosed in the patent document 2, when the friction engaging device is released, lubricating oil introduced into the oil groove is dragged by the relative rotation to mutual mating plate and flows into the middle of the oil groove. Thus, lubricating oil is flowed out from the middle of the oil groove to the axial direction so that the clearance between the friction plate and the separator plate is increased during lubricating oil is flowed out and then the non-engagement force can be efficiently generated. As a result, the drag torque is reduced even in low speed rotation and fuel efficiency can be improved by friction reduction.

Recently, however, since a clearance, when the clutch is in a disengagement state, between a friction plate and a mating plate has been reduced due to a requirement for miniaturization of a friction clutch, a friction plate capable of further reducing a drag torque is desirable. In addition, when the clutch is in a disengagement state, further improvement of cooling performance is also desirable.

SUMMARY OF INVENTION

In view of the foregoing, the prevent invention provides a friction plate in which drag torque may be reduced and cooling performance can also be improved.

The above-described problems are solved by a friction plate comprising:

a first friction material set and second friction material set which are alternately attached to a surface of an annular core plate in a circumferential direction; and an oil groove which is communicating an inner circumferential side with an outer circumferential side and is formed between the first friction material set and the second friction material set, wherein the oil groove is configured so that an outer circumferential oil groove extending from nearly the center between an inner circumferential edge and an outer circumferential edge of the surface of the annular core plate toward the outer circumferential side and an inner circumferential oil groove extending from nearly the center toward the inner circumferential side intersect with each other at an angle;

the first friction material set has a first segment and a second segment, and an outer circumferential communicating oil groove is formed between the first segment and the second segment, extending from nearly the center toward the outer circumferential side and communicates with the inner circumferential oil groove; and the second friction material set has a third segment and a fourth segment, and an inner circumferential communicating oil groove is formed between the third segment and the fourth segment, extending from nearly the center toward the inner circumferential side and communicates with the inner circumferential oil groove.

According to the present invention, when a friction plate rotates in the disengagement state of a friction clutch, lubricating oil flowing from an outer circumferential oil groove into an inner circumferential side rides onto a first segment of a first friction material set or lubricating oil flowing from an inner circumferential oil groove into an outer circumferential side rides onto a third segment of a second friction material set. Thereby, the clearance between the friction plate and the separator plate is increased by making the lubricating oil flow in the axial direction. In addition, a volume of air in the lubricating oil which rides onto the segments can be increased. Therefore, this permits a reduction in the drag torque.

On the other hand, when a friction plate rotates in the engagement state of the friction clutch, since lubricating oil flowing from the outer circumferential oil groove into an inner circumferential side or from the inner circumferential oil groove into an outer circumferential side flows out through an outer circumferential communication oil groove which is provided between the first segment and a second segment of the first friction material set or an inner circumferential communicating oil groove which is provided between the third segment and a fourth segment of the second friction material set, heat exchange efficiency can be improved by circulating the lubricating oil and therefore cooling efficiency can be also improved.

Further, the outer circumferential oil groove and the inner circumferential communicating oil groove are configured to be linearly communicated or the inner circumferential oil groove and the outer circumferential communicating oil groove are configured to be linearly communicated so that the lubricating oil flows out of the friction plate smoothly. Therefore, cooling efficiency can be further improved.

Also, a first oil reservoir recess is provided at a position facing the outer circumferential oil groove of the first segment of the first friction material set, or a second oil reservoir recess is provided at a position facing the inner circumferential oil groove of the third segment of the second friction material set so that the lubricating oil is accumulated in the first oil reservoir recess or the second oil reservoir recess. Therefore, the lubricating oil easily rides onto the first segment or the third segment and the drag torque may further be reduced.

DESCRIPTION OF EMBODIMENTS

Figure 1:
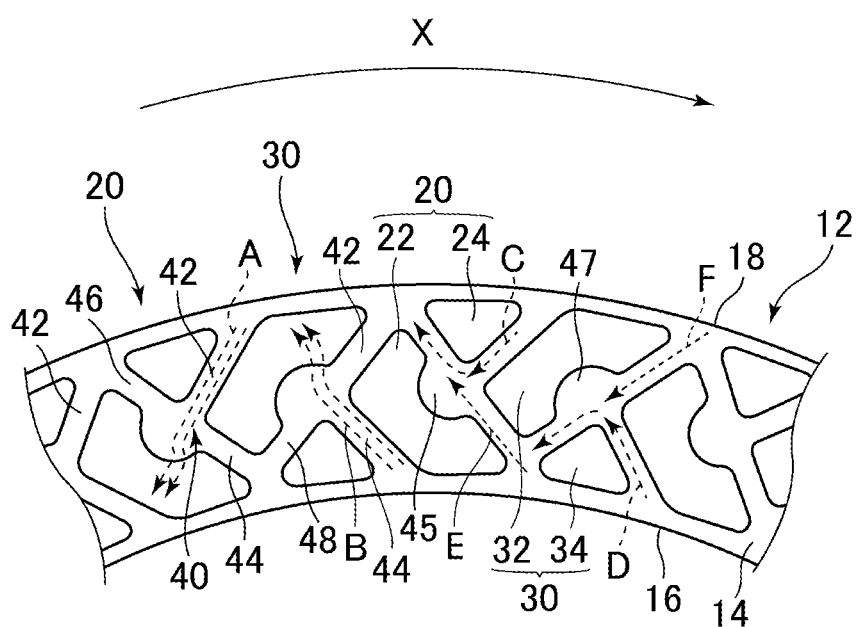
FIG. 1 is a partial front view of a friction plate illustrating a first embodiment of the present invention.
Figure 2:
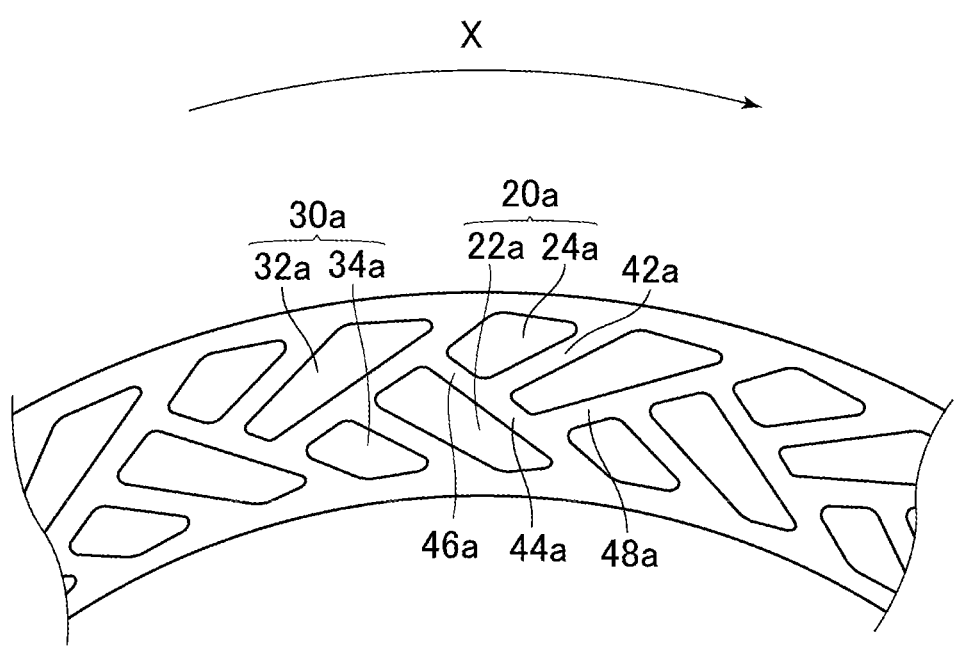
FIG. 2 is a partial front view of a friction plate illustrating a second embodiment of the present invention.
Figure 3:
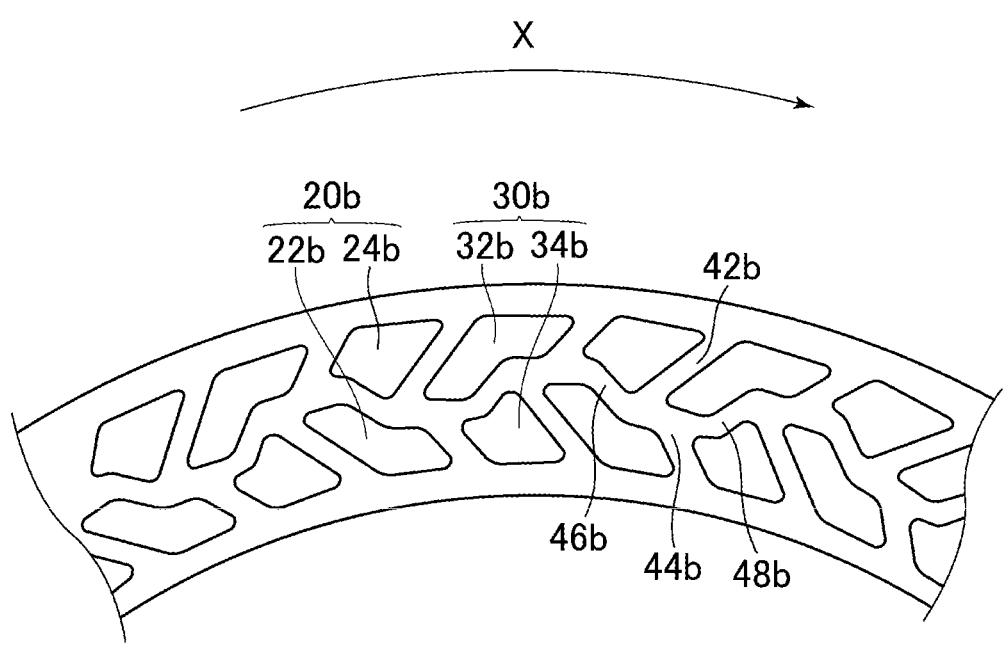
FIG. 3 is a partial front view of a friction plate illustrating a third embodiment of the present invention.

The following will describe embodiments of the present invention in detail with reference to the appending drawings (FIGS. 1 to 3). Still, the present invention is not limited to these embodiments. Also, a friction plate of the present invention is used for a friction clutch. Therefore, the description of the friction clutch with drawings is omitted, since the basic structure of the friction clutch is well-known.

As shown in FIG. 1, a friction plate 10 of the present invention has a surface 14 of a core plate 12, and a first friction material set 20 having a first segment 22 positioned at a relatively inner circumferential side and a second segment 24 at positioned at a relatively outer circumferential side and a second friction material set 30 having a third segment 32 positioned at a relatively outer circumferential side and a forth segment 34 at positioned at a relatively inner circumferential side are alternately attached thereto in the circumferential direction. An illustration is omitted, but, more particularly, the core plate 12 has an annular shape, and the first and second friction material sets 20, 30 are attached to the surface 14 of the core plate 12 along its circumferential direction. The same manner is applied to FIGS. 2 and 3. In addition, a spline is also provided on the core plate 12 to be spline-fitted to a hub and the like (not illustrated).

An oil groove 40 communicating the inner circumferential side with the outer circumferential side is formed between the first friction material set 20 and the second friction material set 30. The oil groove 40 is configured so that an outer circumferential oil groove 42 extending from nearly the center between an inner circumferential edge 16 and an outer circumferential edge 18 of the surface 14 toward the outer circumferential side and an inner circumferential oil groove 44 extending from nearly the center toward the inner circumferential side intersect with each other with an angle. An interior angle formed by the outer circumferential oil groove 42 and the inner circumferential oil groove 44 is preferably at 30 to 120 degrees. Also, all the interior angles on the friction plate 10 do not need to have the same angle.

A position of each segment of the first friction material set 20 and the second friction material set 30 adjacent to the oil groove 40 in relation to the inner circumferential side and the outer circumferential side is reversed to each friction material set. As described above, the first friction material set has a first segment 22 and a second segment 24. An outer circumferential communication oil groove 46 is formed between the first segment 22 and the second segment 24. The outer circumferential communication oil groove 46 extends from nearly the center between the inner circumferential edge 16 and the outer circumferential edge 18 of the surface 14 toward the outer circumferential side and communicates with the inner circumferential oil groove 44 and the outer circumferential oil groove 42. In the case of the friction plate 10, the outer circumferential communicating oil groove 46 linearly communicates with the inner circumferential oil groove 44.

On the other hand, the second friction material set 30 has a third segment 32 and a fourth segment 34. An inner circumferential communicating oil groove 48 is formed between the third segment 32 and the fourth segment 34. The inner circumferential communicating oil groove 48 extends from nearly the center between the inner circumferential edge 16 and the outer circumferential edge 18 of the surface 14 toward the inner circumferential side and communicates with the inner circumferential oil groove 44 and the outer circumferential oil groove 42. In the case of the friction plate 10, the inner circumferential communicating oil groove 48 also linearly communicates with the outer circumferential oil groove 42.

Also, the first segment 22 of the first friction material set 20 includes a first oil reservoir recess 45. The first oil reservoir recess 45 is provided at a position facing the outer circumferential oil groove 42. The shape of the first oil reservoir recess 45 of the friction plate 10 is semicircular, but it is not limited to this. Any shapes are applicable, so long as lubricating oil is accumulated therein. Similarly, the third segment 32 of the second friction material set 30 also includes a second oil reservoir recess 47 which is provided at a position facing the inner circumferential oil groove 44.

According to the friction plate 10 as mentioned above, when the friction plate 10 rotates in the direction of an arrow X in the disengagement state of a friction clutch, while lubricating oil flowing from the outer circumferential oil groove 42 into the inner circumferential side (in the direction of an arrow A) rides onto the first segment 22 of the first friction material set 20, lubricating oil flowing from the inner circumferential oil groove 44 into the outer circumferential side (in the direction of an arrow B) rides onto the third segment 32 of the second friction material set 30. Thereby, the clearance between the friction plate 10 and the mating plate (not illustrated) is increased by making the lubricating oil flow in the axial direction. In addition, a volume of air in the lubricating oil which rides onto the segments can be increased. Therefore, this enables a reduction in the drag torque.

Further, when the friction 10 plate rotates in the direction of the arrow X in the engagement state of the friction clutch, lubricating oil flowing from the outer circumferential oil groove 42 into the inner circumferential side flows in the direction of an arrow C through the outer circumferential communicating oil groove 46 together with the flow of the lubricating oil which flows from the inner circumferential oil groove 44 in the direction of an arrow E. At the same time, the lubricating oil flowing from the inner circumferential oil groove 44 into the outer circumferential side flows in the direction of an arrow D through the inner circumferential communicating oil groove 48 together with the flow of the lubricating oil which flows from the outer circumferential oil groove 42 in the direction of an arrow F.

Thus, as the lubricating oil flows out, heat exchange efficiency can be improved by circulating the lubricating oil and therefore cooling efficiency can be also improved.

The outer circumferential oil groove 42 and the inner circumferential communicating oil groove 48 are configured to be linearly communicated or the inner circumferential oil groove 44 and the outer circumferential communicating oil groove 46 are configured to be linearly communicated such as the friction plate 10 so that the lubricating oil flows out of the friction plate 10 smoothly. Therefore, cooling efficiency can be further improved.

On the other hand, the first oil reservoir recess 45 or the second oil reservoir recess 47 are provided so that lubricating oil is accumulated in the first oil reservoir recess 45 or the second oil reservoir recess 47 when the friction plate 19 rotates in the direction of the arrow X in the engagement state of the friction clutch. Therefore, the lubricating oil easily rides onto the first segment 22 of the first friction material set 20 or the third segment 32 of the second friction material set 30 and the drag torque may further be reduced.

In a friction plate 10a as shown in FIG. 2, an interior angle formed by the outer circumferential oil groove 42a and the inner circumferential oil groove 44a is narrower than that of the friction plate 10. Similarly to the friction plate 10a, the shape of a first segment 22a and a second segment 24a of a first friction material set 20a and a third segment 32a and a fourth segment 34a of a second friction material set 30a can be properly changed according to a configuration of an oil groove and the like. This structure such as the friction plate 10a, when the friction plate 10a rotates in the direction of the arrow X, can also reduce the drag torque and improve cooling performance.

Furthermore, an outer circumferential oil groove 42b and an inner circumferential communicating oil groove 48b, and an inner circumferential oil groove 44b and an outer circumferential communicating oil groove 46b do not need to be linearly communicated respectively such as the friction plate 10b as shown in FIG. 3. This structure, when the friction plate 10b rotates in the direction of the arrow X, can also reduce drag torque and improve cooling performance.

The outer circumferential oil grooves 42, 42a, 42b, the inner circumferential oil grooves 44, 44a, 44b, the outer circumferential communicating oil grooves 46, 46a, 46b, and the inner circumferential communicating oil grooves 48, 48a, 48b can be formed even if a friction material is not attached to the corresponding part of a plate. For example, pressing work, or removing work such as cutting can be applied to an annular friction material. In addition, a friction material or an oil groove can be provided on opposite surfaces of a plate. A direction of a friction material and/or an oil groove may be adjusted according to a rotational direction of a friction plate.

As described above, according to the present invention, while the lubricating oil can be efficiency flowed out in the engagement state of the friction clutch, in the disengagement state of the friction clutch the clearance between the friction plate and the mating plate is increased by making the lubricating oil flow in the axial direction. In addition, a volume of air in lubricating oil which rides onto the segments can be increased. Thereby, a friction plate in which the drag torque is more reduced can be provided.

EXPLANATION OF REFERENCES 10-10b friction plate
12 core plate
14 surface
16 inner circumferential edge
18 outer circumferential edge
20-20b first friction material set
22-22b first segment
24-24b second segment
30-30b second friction material set
32-32b third segment
34-34b fourth segment
40 oil groove
42-42b outer circumferential oil groove
44-44b inner circumferential oil groove
45 first oil reservoir recess
46-46b outer circumferential communicating oil groove
47 second oil reservoir recess
48-48b inner circumferential communicating oil groove

The invention claimed is:
1. A friction plate comprising:
a first friction material set and a second friction material set which are alternately attached to a surface of an annular core plate in a circumferential direction; and
an oil groove which is communicating an inner circumferential side with an outer circumferential side and is formed between the first friction material set and the second friction material set,
wherein the oil groove is configured so that an outer circumferential oil groove extending from nearly a center between an inner circumferential edge and an outer circumferential edge of the surface of the annular core plate toward the outer circumferential side and an inner circumferential oil groove extending from nearly the center toward the inner circumferential side intersect with each other with an angle;

the first friction material set has a first segment and a second segment, and an outer circumferential communication oil groove is formed between the first segment and the second segment, extending from nearly the center toward the outer circumferential side and communicates with the inner circumferential oil groove; and the second friction material set has a third segment and a fourth segment, and an inner circumferential communicating oil groove is formed between the third segment and the fourth segment, extending from nearly the center toward the inner circumferential side and communicates with the inner circumferential oil groove.

2. The friction plate according to claim 1, wherein the inner circumferential communicating oil groove linearly communicates with the outer circumferential oil groove.

3. The friction plate according to claim 2, wherein the outer circumferential communicating oil groove linearly communicates with the inner circumferential oil groove.

4. The friction plate according to claim 3, wherein a first oil reservoir recess is provided at a position facing the outer circumferential oil groove of the first segment.

5. The friction plate according to claim 4, wherein a second oil reservoir recess is provided at a position facing the inner circumferential oil groove of the third segment.

6. The friction plate according to claim 1, wherein the outer circumferential communicating oil groove linearly communicates with the inner circumferential oil groove.

7. The friction plate according to claim 6, wherein a first oil reservoir recess is provided at a position facing the outer circumferential oil groove of the first segment.

8. The friction plate according to claim 7, wherein a second oil reservoir recess is provided at a position facing the inner circumferential oil groove of the third segment.

9. The friction plate according to claim 1, wherein a first oil reservoir recess is provided at a position facing the outer circumferential oil groove of the first segment.

10. The friction plate according to claim 9, wherein a second oil reservoir recess is provided at a position facing the inner circumferential oil groove of the third segment.

11. The friction plate according to claim 1, wherein a second oil reservoir recess is provided at a position facing the inner circumferential oil groove of the third segment.

\* \* \* \* \*